(12) United States Patent
Bascombe

(10) Patent No.: US 8,397,984 B1
(45) Date of Patent: Mar. 19, 2013

(54) SYSTEM FOR ON-SITE MANAGEMENT OF AN EVENT

(75) Inventor: Simon M. Bascombe, Emeryville, CA (US)

(73) Assignee: Eventbrite, Inc., San Francisco, CA (US)

( * ) Notice: Subject to any disclaimer, the term of this patent is extended or adjusted under 35 U.S.C. 154(b) by 0 days.

(21) Appl. No.: 13/234,000

(22) Filed: Sep. 15, 2011

(51) Int. Cl.
*G06F 17/00* (2006.01)

(52) U.S. Cl. .................................... 235/375; 235/495

(58) Field of Classification Search .................. 235/375, 235/495

See application file for complete search history.

(56) References Cited

U.S. PATENT DOCUMENTS

| 7,339,783 B2 * | 3/2008 | McEwan et al. | 361/679.55 |
| 2010/0219234 A1 * | 9/2010 | Forbes | 235/375 |

OTHER PUBLICATIONS

U.S. Appl. No. 12/981,913, filed Dec. 30, 2010, Julie Ann Thompson.

* cited by examiner

*Primary Examiner* — Kristy A Haupt
(74) *Attorney, Agent, or Firm* — Baker Botts L.L.P.

(57) ABSTRACT

A system includes a first portable, ruggedized, and waterproof case. The first portable, ruggedized, and waterproof case includes a router and a switch. The system further includes a computing system connectable to the switch. The computing system includes a first memory for storing first ticket information and a first set of instructions. The computing system further includes a first processor that, upon execution of the first set of instructions, receives a ticket identifier scanned from a ticket. The first processor also compares the ticket identifier to the stored first ticket information. Based on the comparison, the first processor further generates an indication of validity of the ticket. The first processor further transmits the indication of validity of the ticket.

15 Claims, 5 Drawing Sheets

1

SYSTEM FOR ON-SITE MANAGEMENT OF AN EVENT

TECHNICAL FIELD

The present disclosure generally relates to event management systems and systems for managing and monitoring ticket processing and attendee check-in at events.

BACKGROUND

Entry management at events is a long established problem. Typically, event organizers will have someone man the door equipped with a clipboard, a list of all the registered attendees printed on paper and a pen to mark off those who have entered. The process is time consuming and breaks down when an event has multiple locations with multiple points of entry. Entry lines will often be long and slow as the person at the door looks up each person on the list. When multiple locations are involved, a person could sneak into the event by giving the name of a person that went in the other door.

Event management information can be stored in relational databases. Generally, a relational database is a collection of relations (frequently referred to as tables). Relational databases use a set of mathematical terms, which may use Structured Query Language (SQL) database terminology. MySQL is a relational database management system (RDBMS) that runs as a server providing multi-user access to a number of databases. SQLite is a software library that implements a self-contained, serverless, zero-configuration, transactional SQL database engine.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure are best understood by referring to FIGS. 1 through 9 of the drawings, like numerals being used for like and corresponding parts of the various drawings.

Figure 1:
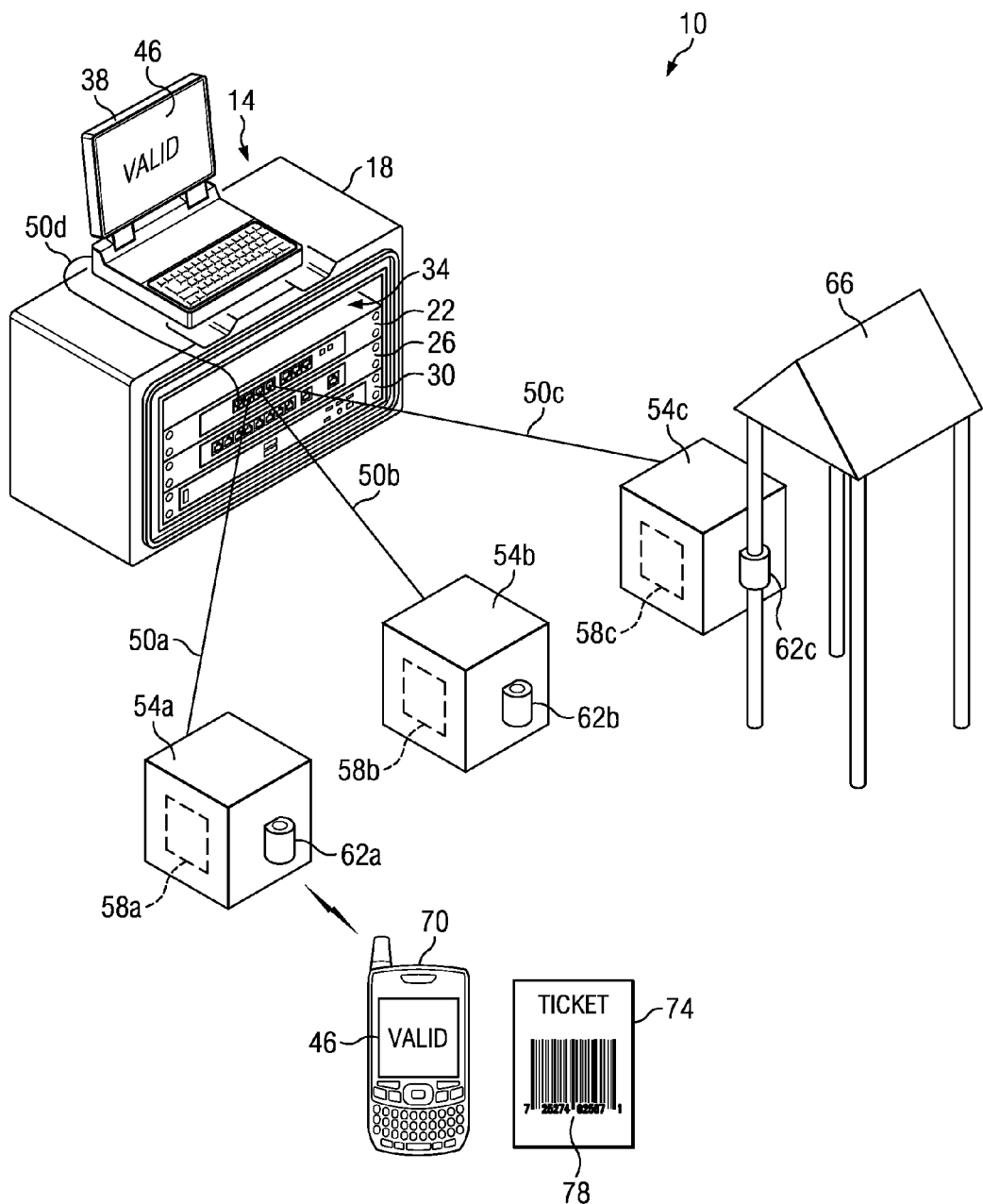
FIG. 1 illustrates a system that provides on-site management of spectator entry into an event.

FIG. 1 illustrates a system 10 that provides on-site management of spectator entry into an event. System 10 includes a gatekeeper system 18 that may manage entry of spectators into an event by providing an indication of validity 42 for a ticket 72 presented by a spectator attempting entry into the event. According to the illustrated embodiment, gatekeeper system 14 includes a protective casing 18 that protects gatekeeper system 14 from one or more conditions that may be present on-site at an event. In particular embodiments, protective casing 18 is a portable, ruggedized, and waterproof casing that houses a router 22, a switch 26, an uninterrupted power supply 30, and a gatekeeper computing system 38, each of which may assist gatekeeper system 14 in providing the indication of validity 42 of the ticket 72 presented by a spectator at the event. In particular embodiments, since protective casing 18 is a portable, ruggedized, and waterproof casing, gatekeeper system 14 may be easily transported to an event, and set up to provide on-site management of spectator entry into the event without subjecting the components of gatekeeper system 14 to the conditions on-site. In particular embodiments, since gatekeeper system 14 includes each of router 22, switch 26, uninterrupted power supply 30, and gatekeeper computing system 38 (all housed in protective casing 18) gatekeeper system 14 may be easily transported to and set up on-site to provide on-site management of spectator entry into an event.

As discussed above, gatekeeper system 14 provides the indication of validity 46 of the ticket 74 presented by a spectator attempting to enter an event. An event may be, for example, a party, a concert, a conference, a sporting event, a fundraiser, a networking event, or a live performance. Although various event forums may have built-in systems for managing spectator entry into the event (such as football stadiums), many events may occur in locations where a built-in system for managing spectator entry is unavailable. For example, some events may occur in parking lots, open fields, fairgrounds, buildings that typically do not host events, and/or other locations where a built-in system for managing spectator entry is not available. Furthermore, many of these locations may have conditions (such a little to no protection from wind, rain, mud, etc) that are unsuitable for electronic systems. In particular embodiments, gatekeeper system 14 may manage entry of spectators into an event. Furthermore, gatekeeper system 18 may include a protective casing 18 that protects gatekeeper system 14 from one or more conditions that may be present on-site at an event.

According to the illustrated embodiment, gatekeeper system 14 includes protective casing 18, router 22, switch 26, uninterrupted power supply 30, storage area 34, and gatekeeper computing system 38. In particular embodiments, gatekeeper system 14 may include any other components for providing the indication of validity 46 of the ticket 74 presented by a spectator attempting entry at an event.

Protective casing 18 represents any components that may protect gatekeeper system 14 from one or more conditions that may be present on-site at an event. In particular embodiments, protective casing 18 is a portable casing. As such, protective casing 18 (and any components of gatekeeper system 14 located inside of protective casing 18) may be easily transported to and from an event. In particular embodiments, protective casing 18 may be carried by three people or less. In particular embodiments, protective casing 18 is a ruggedized casing. As such, protective casing 18 (and any components of gatekeeper system 14 located inside of protective casing 18) may be protected from rough handling and accidents that may occur on-site at the event. For example, protective casing 18 may be accidentally dropped from small heights (such as less than 3 feet) without damaging (or substantially damaging) one or more components of gatekeeper system 14. In particular embodiments, protective casing 18 is a waterproof casing. As such, protective casing 18 (and any components of gatekeeper system 14 located inside of protective casing 18) may be protected from liquids (such as water) and/or mixtures of liquids and solids (such as mud). In particular embodiments, protective casing 18 is a portable, ruggedized, and/or waterproof casing.

Protective casing 18 may be made of any material type that allows it to be portable, ruggedized, and/or waterproof. For example, protective casing 18 may be made out of a polypropylene copolymer material that is lightweight, durable and highly chemical resistant.

Router 22 represents any components that may join two or more wired or wireless networks together so as to route data between the networks. Router 22 may include any suitable router. For example, router 22 may include a multi-wide area network (WAN) router. As such, router 22 may load balance between various network connections so as to provide optimum connectivity. In particular embodiments, router 22 may include any router available from Peplink, such as the Peplink Balance 30, or any router available from any other router manufacturer or provider.

Figure 2:
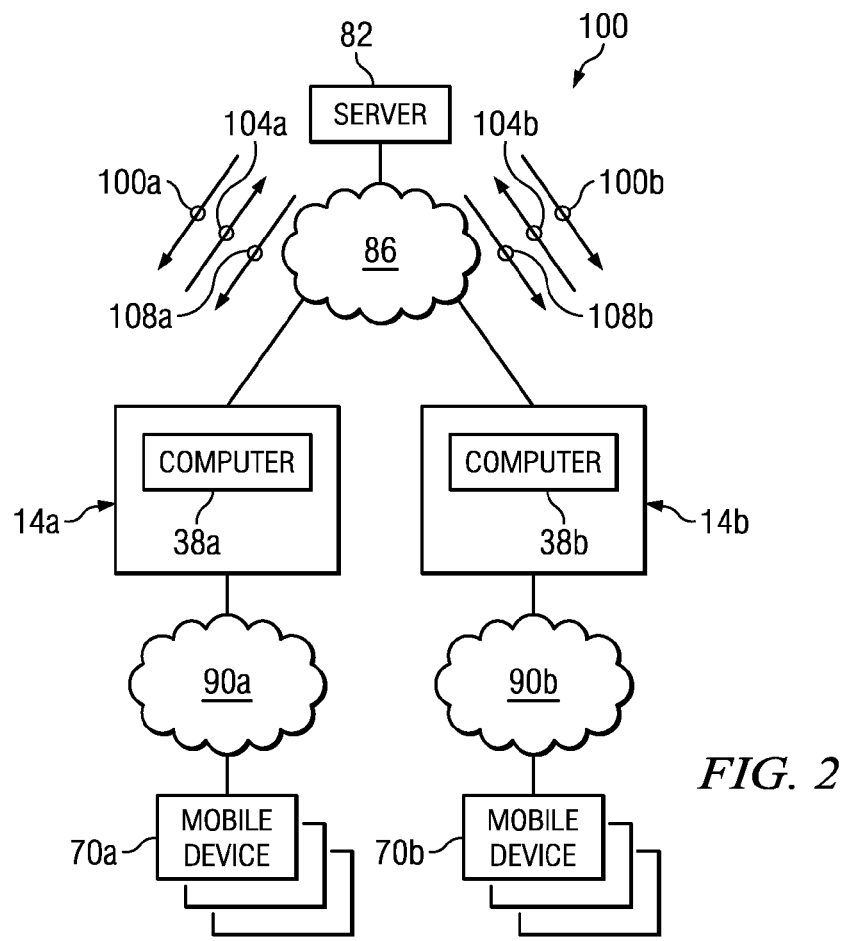
FIG. 2 illustrates an example system for implementing an on-line gatekeeper system in order to provide on-site management of spectator entry into an event.

In particular embodiments, router 22 may couple gatekeeper system 14 to one or more networks so that ticket information stored on gatekeeper computing system 38 may be updated from a master ticket information list for the event, as is discussed in further detail in FIG. 2. In particular embodiments, this may allow gatekeeper computing system 38 to have the most current information with regard to the event being managed.

In particular embodiments, router 22 may connect to a WAN at the operating site of the event (such as by connecting directly to a digital subscriber line (DSL) available at the operating site of the event). In particular embodiments, if a WAN is not available at the operating site of the event, router 22 may connect to any suitable network (such as networks provided by a mobile router, a mobile WiFi device, and/or media center bridges).

Router 22 may include any number of connection ports and any type of connection ports for joining two or more wired or wireless networks together. For example, router 22 may include Universal Serial Bus (USB) connection ports, Ethernet cabling connection ports (such as connection ports for category 5 cable), any other connection ports, or any combination of the preceding. In particular embodiments, router 22 may be located inside of protective casing 18. As such, router 22 may be protected from the outside environment throughout its operation.

Switch 26 represents any components that join two or more computing systems together into a single network. For example, switch 26 may join two or more computing systems together into a single local area network (LAN). In particular embodiments, switch 26 may include any type of switch. For example, switch 22 may include any switch available from Cisco Systems, Inc., such as the Cisco SF302-08P, or any switch available from any other switch manufacturer or provider.

In particular embodiments, switch 22 may be a power over Ethernet (POE) switch that may route both electrical power and data between multiple computing systems. According to the illustrated embodiment, switch 26 connects access points 58 to gatekeeper computing system 38. As such, not only may switch 26 provide power for each access point 58 and also for gatekeeper computing system 38, but switch 26 may further route data packets between access points 58 and gatekeeper computing system 38.

Switch 26 may include any number of connection ports and any type of connection ports for joining two or more computing systems together into a single network. For example, switch 26 may include USB connection ports, Ethernet cabling connection ports (such as connection ports for category 5 cable), any other connection ports, or any combination of the preceding. In particular embodiments, switch 26 may be located inside of protective casing 18. As such, switch 26 may be protected from the outside environment throughout its operation.

Uninterrupted power supply 30 represents any components that may provide power to one or more components of system 10 if an input power source is unavailable. Uninterrupted power supply 30 may include any type of uninterrupted power supply. For example, uninterrupted power supply 30 may include any uninterrupted power supply available from APC, such as the APC SC450RM1U, or any uninterrupted power supply available from any other uninterrupted power supply manufacturer or provider.

In particular embodiments, uninterrupted power supply 30 may be connected to an input power source at the operating site of the event. When the input power source is providing power, uninterrupted power supply 30 may provide the power received from the power source to access points 58 and/or components of gatekeeper system 14 (such as gatekeeper computing system 38). In particular embodiments, such power may be provided to access points 58 and gatekeeper computing system 38 though switch 26. On the other hand, if a power source at the operating site of the event is unavailable or non-operational, uninterrupted power supply 30 may supply power stored at uninterrupted power supply 30 to access points 58 and/or components of gatekeeper system 14. In particular embodiments, uninterrupted power supply 30 may provide stored power for any amount of time. For example, uninterrupted power supply 30 may provide stored power for five minutes, ten minutes, one hour, two hours, four hours, eight hours, or any other amount of time. In particular embodiments, uninterrupted power supply 30 may keep each of the access points 58 and the components of gatekeeper system 14 running for up to six hours.

In particular embodiments, uninterrupted power supply 30 may be located inside of protective casing 18. As such, uninterrupted power supply 30 may be protected from the outside environment throughout its operation.

Storage area 34 represents an area in protective casing 18 that may store gatekeeper computing system 38 when gatekeeper computing system 38 is not in use. For example, when gatekeeper computing system 38 is not operating (such as when gatekeeper system 14 is not yet set up at a particular event), gatekeeper computing system 38 may be stored in storage area 34. Thus, gatekeeper computing system 38 may be protected by protective casing 18. In particular embodiments, prior to gatekeeper computing system 38 being turned on for operation, gatekeeper computing system 38 may be removed from storage area 34 and connected to gatekeeper system 14 (such as through switch 26).

Storage area 34 may have any suitable size and shape. For example, storage area 35 may store a gatekeeper computing system 38 of any size. Furthermore, although storage area 34 has been described as storing gatekeeper computing system 38, in particular embodiments, storage area 34 may further store other components of gatekeeper system 14, such as one or more connectors that may be used to connect various devices to gatekeeper system 14. Additionally, although gatekeeper computing system 38 has been described as being stored in storage area 34 of protective casing 18, and removable from storage area 34 when gatekeeper computing system 38 is in operation, in particular embodiments, gatekeeper computing system 38 may be located inside of protective casing 18 while in operation, as is described in FIG. 7.

Gatekeeper computing system 38 represents any components that may determine the indication of validity 46 of ticket 74, and communicate the indication of validity 46. Gatekeeper computing system 38 may include any suitable computing device, such as, for example, a network server, any remote server, a mainframe, a host computer, a workstation, a personal computer, a laptop, a cellular phone, a smartphone, a personal digital assistant, an ultra-mobile PC, or a computing tablet. Particular embodiments of gatekeeper computing system 38 are further described in FIG. 3.

Indication of validity 46 may represent any indication regarding the validity of ticket 74. For example, indication of validity 46 may indicate that ticket 74 is valid, and therefore the spectator that has presented ticket 74 may be allowed to enter the event. In particular embodiments, indication of validity 46 may indicate that ticket 74 is invalid and therefore the spectator that has presented ticket 74 may not be allowed to enter the event. In addition to indicating the validity of ticket 74, indication of validity 46 may further provide further information regarding ticket 74. For example, indication of validity 46 may further indicate that ticket 74 is valid but entry into the event is not allowed at this time for ticket 74. For example, if certain tickets allow for earlier entry into an event than other tickets, indication of validity 76 may indicate that the ticket 74 is valid, but that entry using the ticket 74 is not permitted at this time. As another example, indication of validity 46 may further indicate that although ticket 74 is valid, ticket 74 may not be used at a particular entry location for the event. For example, particular tickets may require that the tickets be presented at a particular gate. As such, if ticker 74 is presented at the wrong gate, indication of validity 46 may indicate that although ticket 74 is valid, it may not be used to enter at that particular gate.

According to the illustrated embodiment, gatekeeper computing system 38 and access points 58 are connected to switch 26 of gatekeeper system 14 by switch connectors 50. Switch connector 50 may represent any connector that connects a device to switch 26 so that switch 26 may provide data and/or electrical power to the device. In particular embodiments, switch connector 50 may be any type of connector. For example, switch connector 50 may be a category 5 cable. In particular embodiments, switch connector 50 may be rubberized so as to protect it from environments encountered at the event. In particular embodiments, switch connector 50 may have any length so as to connect access points 58 (and/or other devices) to switch 26 over any distance.

Access point protective casing 54 represents any components that may protect access point 58 from one or more conditions that may be present on-site at an event. In particular embodiments, access point protective casing 54 is a portable casing. As such, access point protective casing 54 (and access point 54) may be easily transported to and from an event. In particular embodiments, access point protective casing 54 may be carried by one person. In particular embodiments, access point protective casing 54 is a ruggedized casing. As such, access point protective casing 54 (and access point 58) may be protected from rough handling and accidents that may occur on-site at the event. For example, access point protective casing 54 may be accidentally dropped from small heights (such as less than 3 feet) without damaging (or substantially damaging) access point 58. In particular embodiments, access point protective casing 54 is a waterproof casing. As such, access point protective casing 54 (and access point 58) may be protected from liquids (such as water) and/or mixtures of liquids and solids (such as mud). In particular embodiments, access point protective casing 54 is a portable, ruggedized, and/or waterproof casing.

Access point protective casing 54 may be made of any material type that allows it to be portable, ruggedized, and/or waterproof. For example, access point protective casing 54 may be made out of a polypropylene copolymer material that is lightweight, durable and highly chemical resistant.

According to the illustrated embodiment, access points 58 are positioned within respective access point protective casings 54. Access point 58 represents any components for receiving and transmitting radio signals for a wireless network. In particular embodiments, access point 58 may receive and transmit radio signals for a wireless local area network (WLAN). In particular embodiments, the WLAN may include WiFi, WiMax, BlueTooth, or other suitable standards. Access point 58 may be any type of access point. For example, access point 58 may include any access point available from Cisco Systems, Inc., such as the Cisco 1262 access point, or any access point available from any other access point manufacturer or provider.

In particular embodiments, access point 58 may be a wireless access point. In particular embodiments, access point 58 may receive and send radio signals over any suitable distance. For example, access point 58 may receive and send radio signals across a distance of over 80 feet in each direction. As such, mobile device 70 may be located anywhere within the 80 feet distance from access point 58 and may still communicate with access point 58.

In particular embodiments, access point 58 may be a dual frequency access point. For example, access point 58 may broadcast in two different frequencies, such as 5 GHz and 2.5 GHz. In particular embodiments, access point 58 may operate in accordance with any IEEE 802.11 WLAN standard, such as A, B, G, and/or N. In particular embodiments, access point 58 may receive data from mobile device 70 and transmit the data to gatekeeper computing system 38. In particular embodiments, access point 58 may receive data from gatekeeper computing system 38 and transmit the data to mobile device 70.

In particular embodiments, access point 58 may be autonomous or a so-called "fat" wireless access point or a lightweight wireless access point operating in connection with a wireless switch, such as switch 26. In addition, the network infrastructure may also include a Wireless LAN Solution Engine (WLSE) offered by Cisco Systems, Inc. or another wireless network management system. In some implementations, the network infrastructure may also include one or more Wireless Control System (WCS) nodes operative to manage one or more wireless switches and access points.

According to the illustrated embodiment, access point protective casing 54 may further include connector 62. Connector 62 represents any connector (such as a clamp) that may connect access point protective casing 54 to a support structure. For example, in order for access point 58 to better receive radio signals from mobile device 70, access point protective casing 54 (which includes access point 58) may be positioned off the ground. As such, connector 62 may couple access point protective casing 54 to support structure 66 so as to hold access point protective casing 54 off the ground. In particular embodiments, connector 62 may couple access point protective casing 54 to any suitable support structure. For example, connector 62 may couple access point protective casing 54 to a pole of a tent, a speaker stand, a fence, scaffolding, standard rigging, or any other support structure at the event.

In particular embodiments, access point protective casing 54 may further include any connection port for connecting access point 58 to switch 26. For example, access point protective casing 54 may include an Ethernet card connection that is accessible from the outside of access point protective casing 54.

As is discussed above, access point 58 may receive and transmit communications to and from mobile device 70. Mobile device 70 represents any components that communicate with gatekeeper computing system 38 in order to receive the indication of validity 46 of ticket 74. Mobile device 70 may include any suitable computing device, such as, for example, a personal computer, a laptop, a cellular phone, a smartphone, a personal digital assistant, an ultra-mobile PC, or a computing tablet. In particular embodiments, mobile device 70 may include any mobile device available from Motorola, such as the Motorola Symbol MC65 2D, or any mobile device available from any other mobile device manufacturer or provider. Particular embodiments of mobile device 70 are further described in FIG. 4.

In particular embodiments, mobile device 70 may scan ticket identifier 78 of ticket 74, and communicate the ticket identifier 78 to gatekeeper computing system 38 in order to receive the indication of validity 46 of ticket 74. In particular embodiments, mobile device 70 may scan ticket identifier 78 in any manner. For example, mobile device 70 may include any suitable scanning device, such as, for example a camera, an optical scanner, a barcode scanner, a QR code scanner, or any another scanning device. In particular embodiments, mobile device 70 may further include a display for displaying the indication of validity 46. As such, a user of mobile device 70 may allow the spectator to enter the event or prevent the spectator from entering the event. In particular embodiments, while mobile device 70 is operating in system 10, one or more functionalities of mobile device 70 may be shut down. For example, mobile device 70 may only be able to perform functionalities related to the event management (such as scanning).

Ticket 74 represents any object that may be used to gain access to the event. According to the illustrated embodiment, ticket 74 includes ticket identifier 78. Ticket identifier 78 includes any identifier that may be scanned by mobile device 70 in order to determine whether ticket 74 is valid or not. In particular embodiments, ticket identifier 78 may be an identification number, a barcode, a 2D barcode, a QR code, or another suitable identifier. In particular embodiments, ticket identifier 78 may be unique identifier.

In an example embodiment of operations, a spectator may desire to enter a particular event. In order to do so, the spectator may present ticket 74 to a user with mobile device 70. Mobile device 70 may scan ticket identifier 78 from ticket 74 and transmit ticket identifier 78 to gatekeeper computing system 38. Based on ticket identifier 78, gatekeeper computing system 38 may generate the indication of validity 46 of ticket 74. Gatekeeper computing system 38 may then transmit the indication of validity 46 to mobile device 70 (via switch 26 and access point 58a) so that mobile device 70 may display the indication of validity 46. For example, mobile device 70 may display an indication of validity 46 that indicates that ticket 74 is valid. As such, the user of mobile device 70 may allow the spectator with ticket 74 to enter the event. In particular embodiments, since the components of gatekeeper system 14 are protected by protective casing 18, such management of spectator entry may occur on-site, even in poor conditions.

Modifications, additions, or omissions may be made to system 10 without departing from the scope of the invention. For example, gatekeeper system 14 may include an access point 58 located in protective casing 18. Additionally, system 10 may include any number of gatekeeper systems 10 (and/or components of gatekeeper systems 10), access point protective cases 18 (and/or access points 58), and/or mobile devices 70. Any suitable logic may perform the functions of system 10 and the components within system 10.

FIG. 2 illustrates an example system 100 for implementing an on-line gatekeeper system in order to provide on-site management of spectator entry into an event. System 100 includes an event management system 82 that is connected to gatekeeper systems 14 through network 86. Furthermore, system 100 also includes mobile devices 70 connected to gatekeeper systems 14 through networks 90.

Event management system 82 represents any components that may communicate with gatekeeper computing system 38 of gatekeeper system 14 in order to update ticket information stored on gatekeeper computing system 38 and further to update a master ticket information list stored on event management system 82. Event management system 82 may include any suitable computing device, such as, for example, a network server, any remote server, a mainframe, a host computer, a workstation, a personal computer, or a laptop.

In particular embodiments, event management system 82 may be a network-addressable computing system that can host one or more event organization and management systems. Event management system 82 may generate, store, receive, and transmit event-related data, such as, for example, event listings, event details, event history details, event registration details, event organizer details, event attendee details, ticket purchase details, attendee check-in details, and event displays. Event management system 82 may be accessed by the other components of system 100, either directly or via network 86. Particular embodiments of event management system 82 are further described in FIG. 5.

Network 86 may be any suitable communications network. As an example and not by way of limitation, one or more portions of network 86 may include an ad hoc network, an intranet, an extranet, a virtual private network (VPN), a LAN, a WLAN, a wireless WAN (WWAN), a metropolitan area network (MAN), a portion of the Internet, a portion of the Public Switched Telephone Network (PSTN), a cellular telephone network, or a combination of two or more of these. Network 86 may include one or more networks 86. According to the illustrated embodiment, network 86 may connect gatekeeper systems 14 to event management system 82.

As is discussed in FIG. 1, gatekeeper system 14 may provide the indication of validity 46 of the ticket 74 presented by a spectator attempting to enter an event. As is illustrated, gatekeeper system 14 includes gatekeeper computing system. Gatekeeper computing system 38 represents any components that may determine the indication of validity 46 of ticket 74, and communicate the indication of validity 46. Gatekeeper computing system 38 may include any suitable computing device, such as, for example, a network server, any remote server, a mainframe, a host computer, a workstation, a personal computer, a laptop, a cellular phone, a smartphone, a personal digital assistant, an ultra-mobile PC, or a computing tablet. Particular embodiments of gatekeeper computing system 38 are further described in FIG. 3.

Network 90 may be any suitable communications network. As an example and not by way of limitation, one or more portions of network 90 may include an ad hoc network, an intranet, an extranet, a VPN, a LAN, a WLAN, a WWAN, a MAN, a portion of the Internet, a portion of the PSTN, a cellular telephone network, or a combination of two or more of these. Network 90 may include one or more networks 90. Furthermore, although network 90 and network 86 are illustrated as different networks, in particular embodiments, network 90 and network 86 may be the same network. According to the illustrated embodiment, network 90 may connect mobile devices 70 to gatekeeper system 14.

As is discussed in FIG. 1, mobile device 70 represents any components that communicate with gatekeeper computing system 38 in order to receive the indication of validity 46 of ticket 74. Mobile device 70 may include any suitable computing device, such as, for example, a personal computer, a laptop, a cellular phone, a smartphone, a personal digital assistant, an ultra-mobile PC, or a computing tablet. In particular embodiments, mobile device 70 may include any mobile device available from Motorola, such as the Motorola Symbol MC65 2D, or any mobile device available from any other mobile device manufacturer or provider. Particular embodiments of mobile device 70 are further described in FIG. 4.

In an example embodiment of operations, event management system 82 may include a master ticket information list (discussed in FIG. 5) for a particular event. Once gatekeeper system 14 is connected to event management system 82 through network 86, event management system 82 may send an initial message 100 to gatekeeper system 14. In particular embodiments, initial message 100 may include ticket information (discussed in FIG. 3) for the event. In particular embodiments, ticket information may be an exact copy of the master ticket information list stored at event management system 82. As such, by receiving initial message 100, gatekeeper computing system 38 of gatekeeper system 14 may have a list of all ticket identifiers 78 for the event. In particular embodiments once gatekeeper computing system 38 includes the ticket information, gatekeeper computing systems 38 may be able to provide an indication of validity 46 for each ticket 74. As such, spectators for the event may be allowed to begin presenting tickets 74 for entry into the event.

Once a spectator presents ticket 74 to a user of mobile device 70, mobile device 70 may scan ticket identifier 78 from ticket 74 and transmit ticket identifier 78 to gatekeeper computing system 38 through network 90. Gatekeeper computing system 38 may then compare ticket identifier 78 to the ticket information stored at gatekeeper computing system 38. Based on this comparison, gatekeeper computing system 38 may generate the indication of validity 46 of ticket 74, and transmit the indication of validity 46 to mobile device 70.

In addition to generating the indication of validity 46, gatekeeper computing system 38 may further update the ticket information stored on gatekeeper computing system 38 based on the comparison between the stored information and the ticket identifier 78. For example, based on the comparison, gatekeeper computing system 38 may determine that a particular ticket identifier 78 has been scanned, and therefore may update the ticket information to indicate that the particular ticket identifier 78 has been scanned and may no longer be used to allow any other spectators to enter the event. As such, if another spectator attempts to enter the event with a ticket 74 with that same ticket identifier 78, gatekeeper computing system 38 may determine that the particular ticket identifier 78 has already been used, and may provide an indication of validity 46 that indicates that the ticket is not valid. Thus, the spectator may be prevented from entering the event.

In particular embodiments, while gatekeeper computing system 38 is providing on-site management of spectator entry into the event, gatekeeper computing system 38 may further transmit ticket identification message 104 to event management system 82 through network 86. In particular embodiments, ticket indication message 104 may include any information that may cause event management system 82 to update the master ticket information list stored on event management system 82. For example, ticket indication message 104 may include an indication that a particular ticket identifier 78 has been scanned by a mobile device 70 and transmitted to gatekeeper computing system 38. As such, event management system 82 may update the master ticket information list to indicate that the particular ticket identifier 78 is no longer valid. Therefore, event management system 82 may have a master ticket information list that is kept up to date with the transactions occurring on-site.

In particular embodiments, gatekeeper computing system 38 may transmit ticket indication message 104 at any time. For example, ticket indication message 104 may be transmitted to event management system 82 each time gatekeeper computing system receives ticket identifier 78 and compares that ticket identifier 78 to the ticket information stored on gatekeeper computing system 38. As such, each ticket indication message 104 may only include a single ticket identifier 78.

In particular embodiments, gatekeeper computing system 38 may transmit ticket indication message 104 to event management system 82 periodically. For example, gatekeeper computing system 38 may transmit ticket indication message 104 to event management system 82 every few seconds, every few minutes, every few hours, or after any other amount of time. In particular embodiments, when the ticket indication message 104 is transmitted periodically, the ticket indication message 104 may include more than just a single ticket identifier 78. For example, ticket indication message 104 may include one or more of the ticket identifiers 78 that have been scanned and transmitted to gatekeeper computing system 38 since the last time gatekeeper computing system 38 transmitted ticket indication message 104 to event management system 82. In particular embodiments, ticket indication message 104 may include all of the ticket information stored at gatekeeper computing system 38 or may only include an update (such as all of the new information that has been added to the ticket information stored at gatekeeper computing system 38 since the last ticket indication message 104 was sent to event management system 82).

In particular embodiments, event management system 82 may periodically transmit an update message 108 to gatekeeper computing system 38. Update message 108 may include any indication of one or more changes to the master ticket information list that have occurred since initial message 100 or the last update message 108. In particular embodiments, event management system 82 may transmit update message 108 every few seconds, every few minutes, every few hours, or after any other amount of time.

In particular embodiments, by receiving update message 108, gatekeeper computing system may be able to update the ticket information stored at gatekeeper computing system 38 to match the master ticket information list stored at event management system 82. In particular embodiments, this may allow gatekeeper computing system 38 to have the most current ticket information. Therefore, if gatekeeper computing system 38b has received a particular ticket identifier 78 from mobile device 70b, information regarding that particular ticket identifier 78 may be transmitted to event management system 82, and further transmitted to gatekeeper computing system 38a. As such, if a spectator attempts to enter the event with a ticket 74 that includes the exact same ticket identifier 78 that was already scanned and transmitted to gatekeeper computing system 38b, the ticket information at gatekeeper computing system 38a may include information that indicates that this particular ticket identifier 78 has already been used for entry. As such, gatekeeper computing system 38a may provide an indication of validity 46 that indicates that the ticket identifier 78 is not valid.

Although system 100 illustrates gatekeeper computing system 38 receiving update messages 108 from event management system 82, in particular embodiments, gatekeeper computing system 38 may be unable to connect to event management system 82 (such as when there is no internet connectivity at the event). In such an embodiment, gatekeeper computing system 38 may still include the stored ticket information. As such, gatekeeper computing system 38 may still provide on-site management of spectator entry into the event even when gatekeeper computing system 38 is unable to connect to event management 82.

Modifications, additions, or omissions may be made to system 100 without departing from the scope of the invention. For example, although system 100 illustrates a particular arrangement of event management system 82, network 86, gatekeeper systems 14, networks 90, and mobile devices 70, this disclosure contemplates any suitable arrangement of event management system 82, network 86, gatekeeper systems 14, networks 90, and mobile devices 70. As an example and not by way of limitation, two or more of gatekeeper systems 14 may be connected to each other directly, bypassing network 90 and event management system 82. Additionally, system 100 may include any suitable number of event management systems 82, networks 86, gatekeeper systems 14, networks 90, and/or mobile devices 70. Furthermore, any suitable logic may perform the functions of system 100 and the components within system 100.

Additionally, although system 100 illustrates update messages 108 being transmitted from event management system 82, in particular, update messages 108 may be transmitted directly from gatekeeper computing system 38b to gatekeeper computing system 38a, or vice versa. Furthermore, although system 100 illustrates initial message 100 being received at gatekeeper computing system 38 through network 86, in particular embodiments, initial message 100 (and/or the ticket information) may be received at gatekeeper computing system 38 in any other manner.

Figure 3:
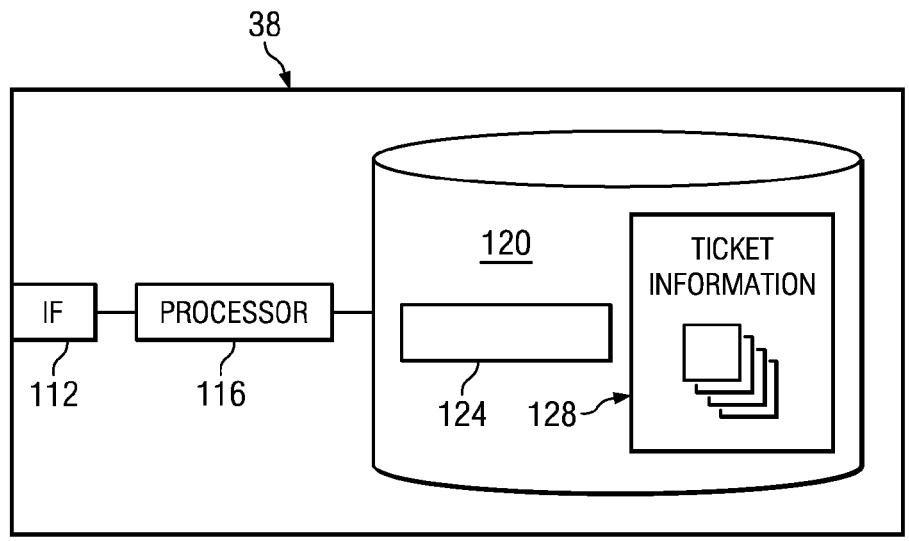
FIG. 3 illustrates an example gatekeeper computing system of FIG. 1.

FIG. 3 illustrates an example gatekeeper computing system 38 of FIG. 1. Gatekeeper computing system 38 represents any components that may determine the indication of validity 46 of ticket 74, and communicate the indication of validity 46. Gatekeeper computing system 38 may include any suitable computing device, such as, for example, a network server, any remote server, a mainframe, a host computer, a workstation, a personal computer, a laptop, a cellular phone, a smartphone, a personal digital assistant, an ultra-mobile PC, or a computing tablet. In the illustrated embodiment, gatekeeper computing system 38 includes a network interface 112, a processor 116, and a memory 120.

Network interface 112 represents any device operable to receive information from a network (such as network 86 and/or network 90 of FIG. 2), transmit information through the network, perform processing of information, communicate to other devices, or any combination of the preceding. For example, network interface 112 receives ticket identifier 78 from mobile device 70. As another example, network interface 112 communicates the indication of validity 46 to mobile device 70. Network interface 112 represents any port or connection, real or virtual, including any suitable hardware and/or software, including protocol conversion and data processing capabilities, to communicate through a LAN, a MAN, a WAN, or other communication system that allows gatekeeper computing system 38 to exchange information with the network, mobile devices 70, event management system 82, other components of system 10 of FIG. 1, or other components of system 100 of FIG. 2.

Processor 116 communicatively couples to network interface 112 and memory 120, and controls the operation and administration of gatekeeper computing system 38 by processing information received from network interface 112 and memory 120. Processor 116 includes any hardware and/or software that operates to control and process information. For example, processor 116 executes application 124 to control the operation of gatekeeper computing system 38. Processor 116 may be a programmable logic device, a microcontroller, a microprocessor, any processing device, or any combination of the preceding.

Memory 120 stores, either permanently or temporarily, data, operational software, or other information for processor 116. Memory 120 includes any one or a combination of volatile or non-volatile local or remote devices suitable for storing information. For example, memory 120 may include random access memory (RAM), read only memory (ROM), magnetic storage devices, optical storage devices, or any other information storage device or a combination of these devices. While illustrated as including particular modules, memory 120 may include any information for use in the operation of gatekeeper computing system 38.

In the illustrated embodiment, memory 120 includes application 124 and ticket information 128. Application 124 represents any suitable set of instructions, logic, or code embodied in a computer-readable storage medium and operable to facilitate the operation of gatekeeper computing system 38.

Ticket information 128 represents any information regarding tickets for the event. For example, ticket information 128 includes a list of ticket identifiers 78 that are valid, a list of ticket identifiers 78 that are not valid, any other information that may be used to manage entry of one or more spectators to the event, or any combination of the preceding. In particular embodiments, when gatekeeper computing system 38 receives a particular ticket identifier 78 from mobile device 70, gatekeeper computing system 38 may access ticket information 128 in order to compare ticket information 128 to the ticket identifier 78. In particular embodiments, if the ticket information 128 indicates that the ticket identifier 78 is valid (such as by determining that ticket identifier 78 was listed as a valid ticket identifier 78), gatekeeper computing system 38 may generate an indication of validity 46 that indicates that ticket 74 is valid.

In particular embodiments, ticket information 128 may further include mobile device setting information. For example, as is discussed above, certain tickets may be given a priority over other tickets. As an example, a higher priced ticket may allow a spectator to enter the event earlier, or from a different gate than lower priced tickets. In particular embodiments, mobile device setting information may include information that indicates which tickets 74 are allowed to be used at particular mobile devices 70. For example, if a particular mobile device 70 is being used at Gate A (which is a gate that may only be accessed by spectators with a ticket 74 that has a Gate A priority), mobile device setting information may include information that indicates that the particular mobile device 70 can only allow entry to spectators that include a ticket 74 with the Gate A priority. As such, if mobile device 70 scans a ticket identifier 78 of a ticket 74 that does not include a Gate A priority, gatekeeper computing system 38 may transmit an indication of validity 46 to mobile device 70 that indicates that the ticket 74 is valid, but not at that gate. The user of mobile device 70 may then direct the spectator to attempt entry to the event at another gate.

In particular embodiments, ticket information 128 may further include information regarding event attendees. For example ticket information 128 may include information describing one or more of the attendees registered to attend the event, include the attendee's name, phone number, mailing address, email address, payment information, ticket order information, ticket information, check-in status, and other suitable attendee information.

Figure 4:
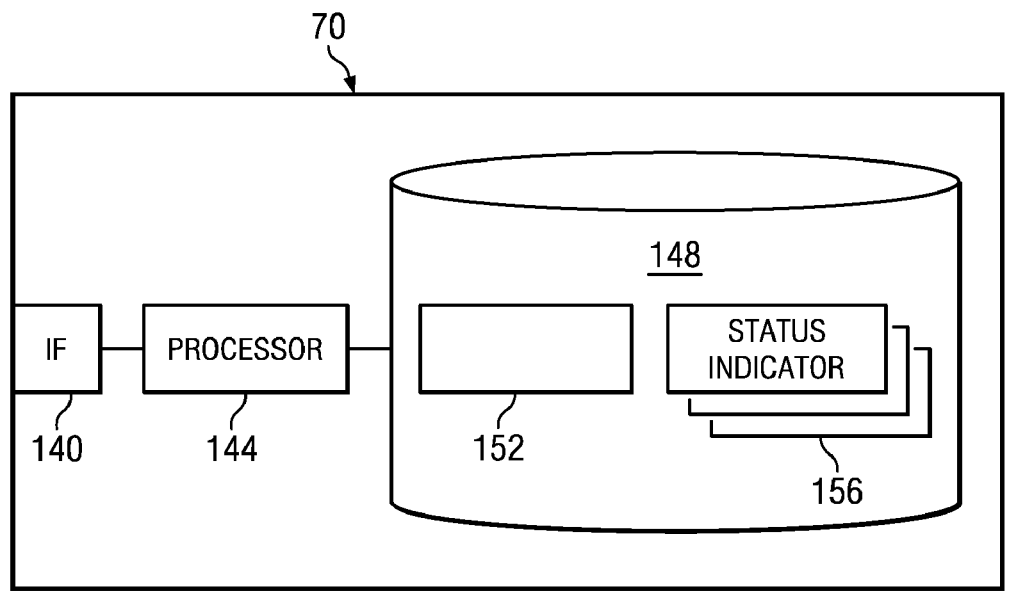
FIG. 4 illustrates an example mobile device of FIG. 1.

FIG. 4 illustrates an example mobile device 70 of FIG. 1. Mobile device 70 represents any components that communicate with gatekeeper computing system 38 in order to receive the indication of validity 46 of ticket 74. Mobile device 70 may include any suitable computing device, such as, for example, a personal computer, a laptop, a cellular phone, a smartphone, a personal digital assistant, an ultra-mobile PC, or a computing tablet. In particular embodiments, mobile device 70 may include any mobile device available from Motorola, such as the Motorola Symbol MC65 2D, or any mobile device available from any other mobile device manufacturer or provider. In the illustrated embodiment, mobile device 70 includes a network interface 140, a processor 144, and a memory 148.

Network interface 140 represents any device operable to receive information from a network (such as network 90 of FIG. 2), transmit information through the network, perform processing of information, communicate to other devices, or any combination of the preceding. For example, network interface 140 communicates ticket identifier 78 to gatekeeper computing system 38. As another example, network interface 140 receives the indication of validity 46 from gatekeeper computing system 38. Network interface 140 represents any port or connection, real or virtual, including any suitable hardware and/or software, including protocol conversion and data processing capabilities, to communicate through a LAN, a MAN, a WAN, or other communication system that allows mobile device 70 to exchange information with the network, gatekeeper computing system 38, other components of system 10 of FIG. 1, or other components of system 100 of FIG. 2.

Processor 144 communicatively couples to network interface 140 and memory 148, and controls the operation and administration of mobile device 70 by processing information received from network interface 140 and memory 148. Processor 144 includes any hardware and/or software that operates to control and process information. For example, processor 144 executes application 152 to control the operation of mobile device 70. Processor 144 may be a programmable logic device, a microcontroller, a microprocessor, any processing device, or any combination of the preceding.

Memory 148 stores, either permanently or temporarily, data, operational software, or other information for processor 144. Memory 148 includes any one or a combination of volatile or non-volatile local or remote devices suitable for storing information. For example, memory 148 may include RAM, ROM, magnetic storage devices, optical storage devices, or any other information storage device or a combination of these devices. While illustrated as including particular modules, memory 148 may include any information for use in the operation of mobile device 70.

In the illustrated embodiment, memory 148 includes application 152 and status indicators 156. Application 152 represents any suitable set of instructions, logic, or code embodied in a computer-readable storage medium and operable to facilitate the operation of mobile device 70.

Status indicators 156 represent any information regarding the status of mobile device 70. For example, status indicators 156 may include a battery level of mobile device 70, a wireless connection signal of mobile device 70, scanning problem indications at mobile device 70 (such as the user of mobile device 70 improperly scanning ticket identifier 78 or the number of tickets 74 that have been presented at the wrong mobile device 70), any other status indicators of mobile device 70, or any combination of the preceding. In particular embodiments, mobile device 70 may retrieve status indicators 156 by monitoring the status of mobile device 70 in any manner. In particular embodiments, mobile device 70 may transmit status indicators 156 to gatekeeper computing system 38.

Figure 5:
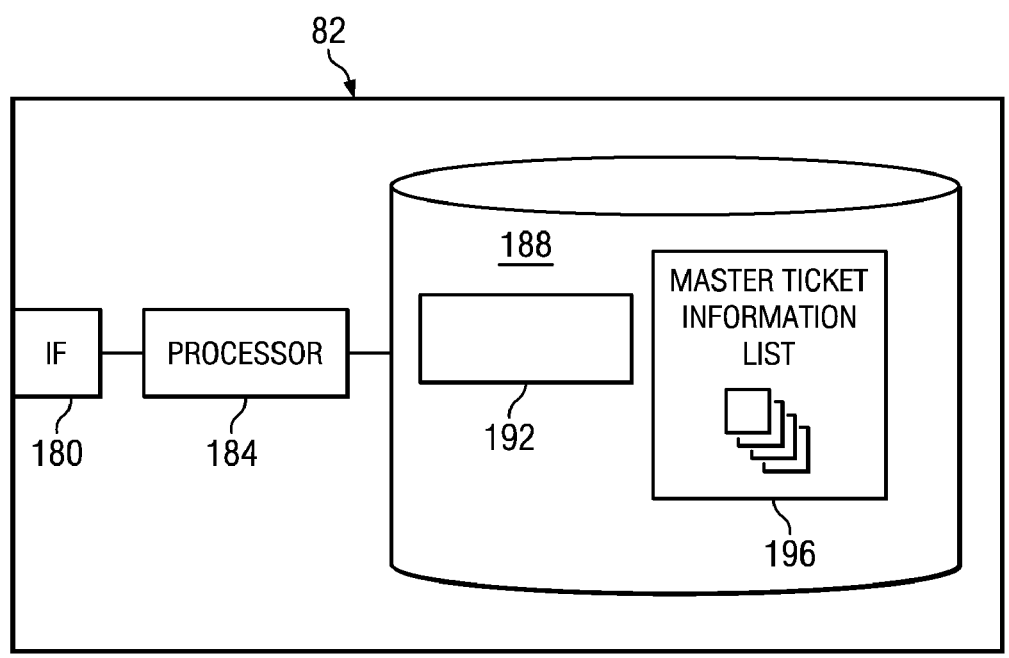
FIG. 5 illustrates an example event management system of FIG. 2.

FIG. 5 illustrates an example event management system 82 of FIG. 2. Event management system 82 represents any components that may communicate with gatekeeper computing system 38 in order to update ticket information stored on gatekeeper computing system 38 and further to update a master ticket information list stored on event management system 82. Event management system 82 may include any suitable computing device, such as, for example, a network server, any remote server, a mainframe, a host computer, a workstation, a personal computer, or a laptop. In the illustrated embodiment, event management system 82 includes a network interface 180, a processor 184, and a memory 188.

Network interface 180 represents any device operable to receive information from a network (such as network 86 of FIG. 2), transmit information through the network, perform processing of information, communicate to other devices, or any combination of the preceding. For example, network interface 180 communicates initial message 100 to gatekeeper computing system 38. As another example, network interface 180 receives ticket indication message 104 from gatekeeper computing system 38. Network interface 180 represents any port or connection, real or virtual, including any suitable hardware and/or software, including protocol conversion and data processing capabilities, to communicate through a LAN, a MAN, a WAN, or other communication system that allows event management system 82 to exchange information with the network, gatekeeper computing system 38, other components of system 10 of FIG. 1, or other components of system 100 of FIG. 2.

Processor 184 communicatively couples to network interface 180 and memory 188, and controls the operation and administration of event management system 82 by processing information received from network interface 180 and memory 188. Processor 184 includes any hardware and/or software that operates to control and process information. For example, processor 184 executes application 192 to control the operation of event management system 82. Processor 184 may be a programmable logic device, a microcontroller, a microprocessor, any processing device, or any combination of the preceding.

Memory 188 stores, either permanently or temporarily, data, operational software, or other information for processor 184. Memory 188 includes any one or a combination of volatile or non-volatile local or remote devices suitable for storing information. For example, memory 188 may include RAM, ROM, magnetic storage devices, optical storage devices, or any other information storage device or a combination of these devices. While illustrated as including particular modules, memory 188 may include any information for use in the operation of event management system 82.

In the illustrated embodiment, memory 188 includes application 192 and master ticket information list 196. Application 192 represents any suitable set of instructions, logic, or code embodied in a computer-readable storage medium and operable to facilitate the operation of event management system 82.

Master ticket information list 196 represents any information regarding tickets for the event. For example, master ticket information list 196 includes a list of ticket identifiers 78 that are valid, a list of ticket identifiers 78 that are not valid, any other information that may be used to manage entry of one or more spectators to the event, or any combination of the preceding. In particular embodiments, master ticket information list 196 is a master list of all the information regarding tickets for the events. As such, if ticket information 128 stored at gatekeeper computing system 38 is lost or corrupted, master ticket information list 196 may be used to proved new ticket information 128 to gatekeeper computing system 38. Furthermore, if any changes occur that affect tickets for the event (such as the purchase of additional tickets 74 or the invalidity of certain ticket identifiers 78), the changes may be added to master ticket information list 196. The changes may then be sent to gatekeeper computing systems 38 in order to update ticket information 128.

In particular embodiments, master ticket information list 196 may further include any of the information included in ticket information 128 stored at gatekeeper computing systems 38. For example, master ticket information list 196 may further include mobile device setting information (discussed above) and information regarding event attendees (also discussed above).

Figure 6:
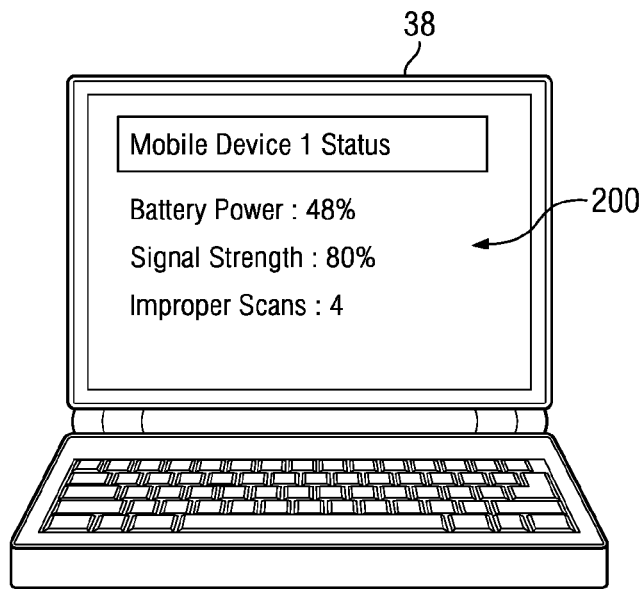
FIG. 6 illustrates an example gatekeeper computing system of FIG. 1.

FIG. 6 illustrates an example gatekeeper computing system 38 of FIG. 1. According to the illustrated embodiment, gatekeeper computing system 38 includes a display that displays indicator information 200 for mobile device 70. In particular embodiments, indicator information 200 includes a graphical display of the battery power of mobile device 70, the signal strength of mobile device 70, and the number of improper scans conducted at mobile device 70. In particular embodiment, indicator information 200 may further include a graphical display of the number of ticket identifiers that have been scanned, the number of spectators that have been allowed and/or denied entry, the number of duplicate scans, the number of wrong gate scans, the number of refunded scans, and/or the time and date of the last scan conducted at mobile device 70. In particular embodiments, indicator information 200 may be displayed by gatekeeper computing system 38 based on status indicators 156 received by the mobile device 70.

Figure 7:
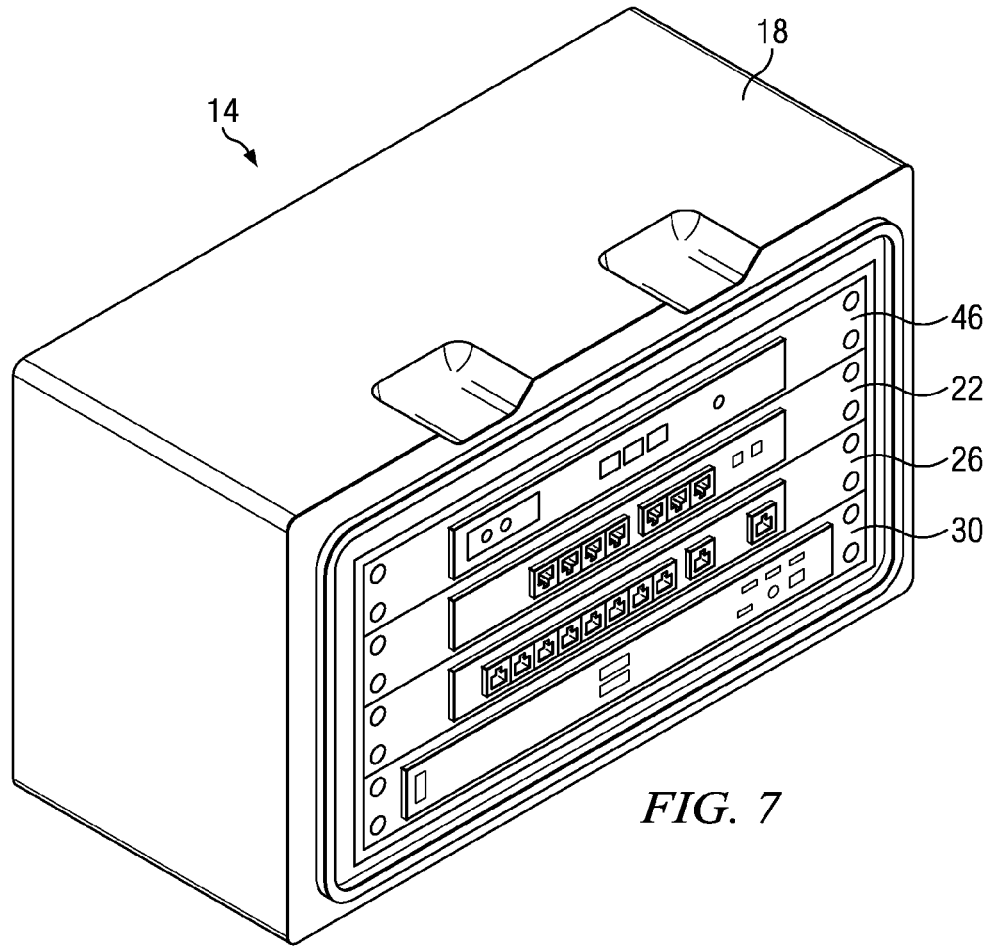
FIG. 7 illustrates an example gatekeeper system of FIG. 1.

FIG. 7 illustrates an example of gatekeeper system 14 of FIG. 1. In particular embodiments, gatekeeper system 14 of FIG. 7 may be an alternative embodiment of gatekeeper system 14 of FIG. 1. According to the illustrated embodiment, and similar to gatekeeper system 14 of FIG. 1, gatekeeper system 14 of FIG. 7 includes protective casing 18, router 22, switch 26, uninterrupted power supply 30, storage area 34, and gatekeeper computing system 38. Unlike gatekeeper system 14 of FIG. 1, however, gatekeeper system 14 of FIG. 7 may include a gatekeeper computing system 38 that is located inside of protective casing 18 while in operation. As such, gatekeeper computing system 38 may be protected from the outside environment throughout its operation.

In particular embodiments, since gatekeeper computing system 38 is located inside of protective casing 18 while in operation, gatekeeper computing system 38 may not include one or more user interfaces (such as one or more of a display, a keyboard, and/or a mouse). Despite not having one or more user interfaces, gatekeeper computing system 38 may still determine the indication of validity 46 of ticket 74, and communicate the indication of validity 46 to a mobile device 70.

In particular embodiments, since gatekeeper computing system 38 may not have one or more user interfaces, a user of gatekeeper system 14 may be able to connect to gatekeeper computing system 38 (such as through network 86 or network 90 of FIG. 2) in order to view a graphical user interface that includes the status of the event (such as the indications of validity 46) and one or more viewable displays provided by gatekeeper computing system 38 (such as indicator information 200 of FIG. 6).

Figure 8:
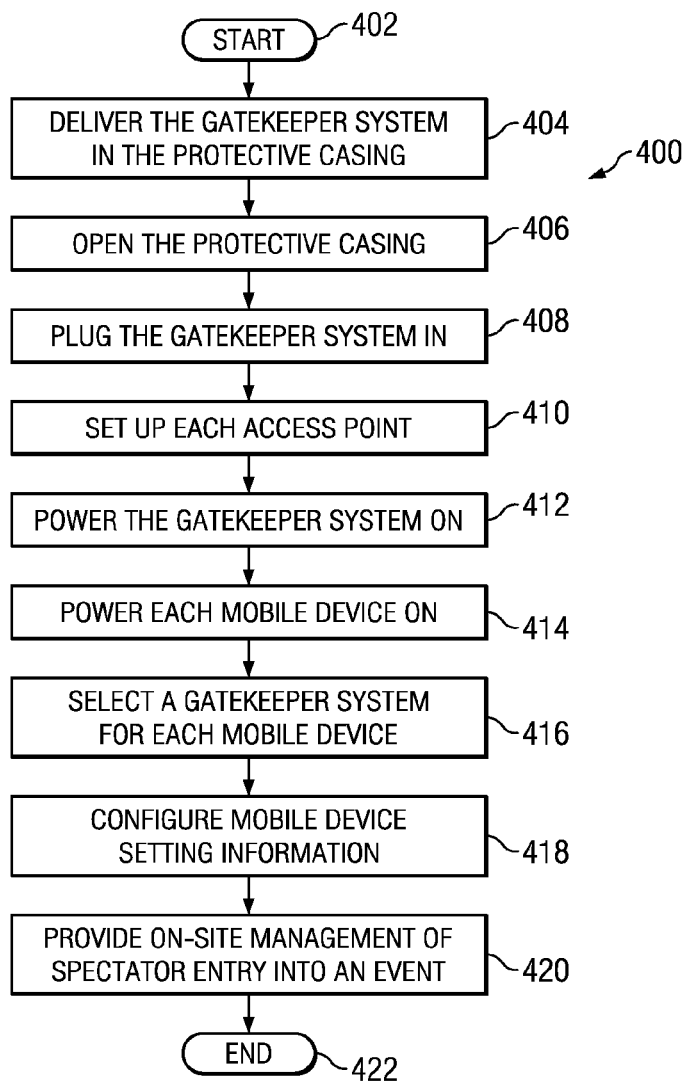
FIG. 8 illustrates a method for setting up a system in order to provide on-site management of spectator entry into an event.

FIG. 8 illustrates a method 400 for setting up a system in order to provide on-site management of spectator entry into an event. In particular embodiments, one or more steps of method 400 may be performed using gatekeeper system 14, access points 58, mobile device 70 and/or event management system 82. The method begins at step 402. At step 404, the gatekeeper system (which is located in the protective casing) is delivered to the event. In particular embodiments, the gatekeeper system may be delivered to the event by carrying the protective casing to the event and setting it down at an operational point at the event.

At step 406, the protective casing is opened. In particular embodiments, the protective casing may be opened by opening a lid of the protective casing. In particular embodiments, the protective casing may be opened in order to access one or more components of the gatekeeper system. In particular embodiments, even when the lid of the protective casing is open, the protective casing may still provide protection to one or more components of the gatekeeper system.

At step 408, the gatekeeper system is plugged in. In particular embodiments, the gatekeeper system may be plugged into a network port in order to connect the router of the gatekeeper system to a WAN or a LAN. In particular embodiments, the gatekeeper system may be plugged in by connecting the gatekeeper system to a power source that provides electrical power to the uninterrupted power supply of the gatekeeper system.

At step 410, each access point is set up. In particular embodiments, each access point may be set up by connecting a switch connector (such as a category 5 cable) to the switch of the gatekeeper system, and running the switch connector to the location where the access point will be positioned. In particular embodiments, setting up each access point may further include coupling each access point to a support structure (such as a pole, speaker stand, fence, or scaffolding) by the connector.

At step 412, the gatekeeper system is powered on. In particular embodiments, the gatekeeper system may be powered on by turning on each component of the gatekeeper system. For example, each of the router, switch, uninterrupted power supply, and gatekeeper computing system may be turned on. In particular embodiments, turning on the gatekeeper computing system may include re-setting the ticket information stored on the gatekeeper computing system and accessing the event management system in order to pull down new ticket information for storage at the gatekeeper computing system (such as by receiving initial message 100 of FIG. 2). In particular embodiments, this may allow the gatekeeper computing system to have a local copy of the ticket information so that the gatekeeper computing system may provide on-site management of spectator entry into the event even when the gatekeeper system is not connected to the event management system. In particular embodiments, the gatekeeper computing system may already be pre-configured to include the ticket information for the event. As such, the gatekeeper computing system may not need to pull down the new ticket information.

At step 414, each mobile device is powered on. In particular embodiments, each mobile device may be powered on by turning on each mobile device.

At step 416, a gatekeeper system for each mobile device is selected. In particular embodiments, the gatekeeper system for each mobile device may be selected by selecting the IP address for the gatekeeper system. In particular embodiments, since more than one gatekeeper system may be used at each event, the mobile device may need to choose which gatekeeper system it will connect to in order to receive an indication of validity for each scanned ticket. In particular embodiments, the IP address for each gatekeeper system may be hardcoded into each mobile device. As such, selecting the gatekeeper system may include selecting one of the gatekeeper systems that is displayed on the display of the mobile device. In particular embodiments, the IP address for the gatekeeper systems may not be hardcoded into the mobile device. As such, the IP address for the selected gatekeeper system may be entered into the mobile device in any manner. For example, a user of the mobile device may type in the IP address for the gatekeeper system. As another example, each gatekeeper system may include a scannable identifier on the gatekeeper system (such as a bar code printed on the protective casing of the gatekeeper system). As such, the gatekeeper system may be selected for the mobile device by scanning the identifier using the mobile device.

Once a gatekeeper system has been selected for each mobile device, the method moves to step 418 where the mobile device setting information is configured. In particular embodiments, configuring the mobile device setting information may include indicating what tickets each mobile device is allowed to scan. In particular embodiments, configuring the mobile device setting information may include accessing the mobile device information stored in the gatekeeper computing system, and configuring the mobile device setting information in any manner. For example, the mobile device setting information for a first mobile device may be configured to only allow the first mobile device to scan tickets with a Gate A priority. Additionally, the mobile device setting information for a second mobile device may be configured to allow the second mobile device to scan any of the tickets.

At step 420, on-site management of spectator entry into an event is provided. In particular embodiments, providing such on-site management may include scanning a ticket identifier of a ticket and transmitting the ticket identifier to the gatekeeper computing system. In particular embodiments, providing on-site management may further include comparing the ticket identifier with the ticket information stored at the gatekeeper computing system, generating an indication of validity of the ticket, and transmitting the indication of validity to the mobile device, so that the user of the mobile device may allow or deny entry to that spectator. In particular embodiments, providing on-site management may further include updating the stored ticket information on the gatekeeper computing system based on the comparison, transmitting ticket indications to the event management system so that the event management system may update the master ticket information list, and receiving update messages from the event management system so that the gatekeeper computing system may keep an updated ticket information.

After on-site management of spectator entry into the event is provided, the method moves to step 422, where the method ends.

Modifications, additions, or omissions may be made to method 400. For example, one or more steps in method 400 in FIG. 8 may be performed in parallel or in any suitable order.

Figure 9:
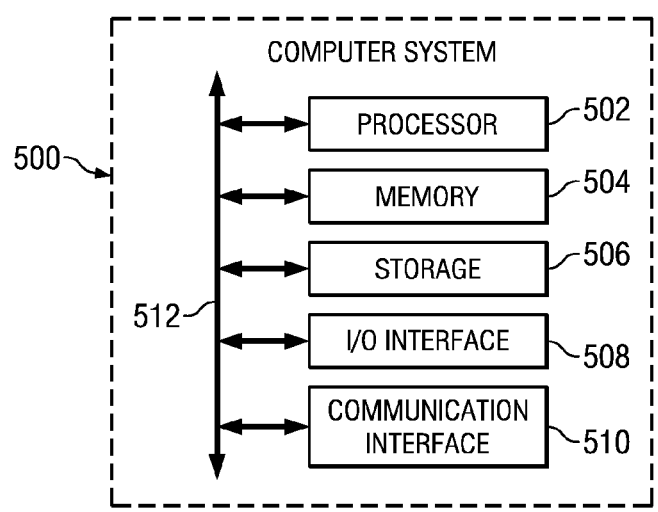
FIG. 9 illustrates an example computer system.

FIG. 9 illustrates an example computer system 500. In particular embodiments, one or more computer systems 500 perform one or more steps of one or more methods described or illustrated herein. In particular embodiments, one or more computer systems 500 provide functionality described or illustrated herein. For example, computer system 500 may be an example of gatekeeper computing system 38, mobile device 70, and/or event management system 82. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system comprising:
a first portable, ruggedized, and waterproof case, the first portable, ruggedized, and waterproof case comprising:
a router; and
a switch;
one or more second portable, ruggedized, and waterproof cases, each of the one or more second portable, ruggedized, and waterproof cases comprising a wireless access point, wherein:
each wireless access point is connected to the switch; and
each wireless access point is connected to by a wireless connection signal to one or more mobile check-in devices for checking in a plurality of attendees of an event; and
a computing system connectable to the switch, the computing system comprising:
a first memory for storing first ticket information and a first set of instructions; and
a first processor operable, upon execution of the first set of instructions, to:
receive a ticket identifier scanned from a ticket;
compare the ticket identifier to the stored first ticket information;
based on the comparison, generate an indication of validity of the ticket; and
transmit the indication of validity of the ticket.

2. The system of claim 1, further comprising one or more mobile check-in devices for checking in a plurality of attendees of the event, each of the one or more mobile check-in devices comprising:
a second memory for storing a second set of instructions; and
a second processor operable, upon execution of the second set of instructions, to:
initiate scanning of the ticket identifier from a ticket;
receive the scanned ticket identifier;
transmit the ticket identifier to the computing system;
receive the indication of validity of the ticket; and
display the indication of validity of the ticket.

3. The system of claim 2, wherein the second processor is further operable, upon execution of the second set of instructions, to:
retrieve one or more status indicators from the mobile check-in device; and
transmit the one or more status indicators.

4. The system of claim 3, wherein the one or more status indicators comprise a battery level of the mobile check-in device.

5. The system of claim 3, wherein the one or more status indicators comprise a wireless connection signal of the mobile check-in device.

6. The system of claim 3, wherein the one or more status indicators comprise one or more scanning problem indications.

7. The system of claim 3, wherein the first processor is further operable, upon execution of the first set of instructions, to:
  receive the one or more status indicators; and
  display indicator information based on the one or more status indicators.

8. The system of claim 1, wherein the first portable, ruggedized, and waterproof case further comprises an uninterrupted power supply.

9. The system of claim 1, wherein the first portable, ruggedized, and waterproof case further comprises an area inside the first portable, ruggedized, and waterproof case for storing the computing system.

10. The system of claim 2, wherein:
  the wireless access point is connectable to the switch through a rubberized category 5 cable, the wireless access point receiving electrical power from the switch.

11. The system of claim 2, wherein each of the one or more second portable, ruggedized, and waterproof cases further comprises a connector operable to couple the respective second portable, ruggedized, and waterproof case to a support structure.

12. The system of claim 11, wherein the support structure is selected from a group consisting of: a pole; a speaker stand; a fence; and scaffolding.

13. The system of claim 1, wherein the first processor is further operable, upon execution of the first set of instructions, to update the stored first ticket information based on the comparison.

14. The system of claim 1, wherein the first processor is further operable, upon execution of the first set of instructions, to transmit a ticket indication message to a remote computing system, the ticket indication message configured to cause the remote computing system to update a master ticket information list.

15. The system of claim 1, wherein the first processor is further operable, upon execution of the first set of instructions, to:
  receive an update message from a remote computing system, the update message including an indication of one or more changes to a master ticket information list; and
  based on the update message, update the stored first ticket information to match the master ticket information list.

* * * * *